US011725828B2

(12) United States Patent
Norman et al.

(10) Patent No.: US 11,725,828 B2
(45) Date of Patent: *Aug. 15, 2023

(54) METHODS AND APPARATUS FOR CONTROLLING A COOKING APPLIANCE

(71) Applicant: Electrolux Home Products, Inc., Charlotte, NC (US)

(72) Inventors: Douglas Chris Norman, Hendersonville, TN (US); Lloyd Smith, Charleston, TN (US); Jonathan Wright, Goodletsville, TN (US); Gavin Williams, Springfield, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 256 days.

This patent is subject to a terminal disclaimer.

(21) Appl. No.: 17/167,645

(22) Filed: Feb. 4, 2021

(65) Prior Publication Data

US 2021/0156566 A1 May 27, 2021

Related U.S. Application Data

(63) Continuation of application No. 15/255,491, filed on Sep. 2, 2016, now Pat. No. 10,935,252.
(Continued)

(51) Int. Cl.
*F24C 7/08* (2006.01)
*H01B 1/02* (2006.01)
(Continued)

(52) U.S. Cl.
CPC .............. *F24C 7/083* (2013.01); *F24C 3/126* (2013.01); *G01J 5/0003* (2013.01);
(Continued)

(58) Field of Classification Search
CPC .. F24C 3/126; F24C 7/08; F24C 7/081; F24C 7/082–087; H05B 1/0266; H05B 2213/07; H05B 3/74; H05B 6/062
(Continued)

(56) References Cited

U.S. PATENT DOCUMENTS 4,493,981 A 1/1985 Payne
5,310,993 A 5/1994 McWilliams et al.
(Continued)

FOREIGN PATENT DOCUMENTS

WO 2015049600 4/2015

*Primary Examiner* — Sang Y Paik
(74) *Attorney, Agent, or Firm* — Pearne & Gordon LLP

(57) ABSTRACT

A cooking appliance includes a cooktop having at least one heating element for heating a cookware member on or to be placed on the cooktop, the at least one heating element being adjustable between a working-power level wherein the at least one heating element is energized to generate heat and a zero-power level wherein the at least one heating element is not energized. The cooking appliance further includes a temperature sensor configured to detect a temperature or rate of temperature change of a cooking element. The cooking appliance further includes a control device configured to adjust the at least one heating element from the working-power level to the zero-power level based on the temperature or rate of temperature change of the cooking element. The at least one heating element will remain at the zero-power level until a user intervenes to re-energize the at least one heating element.

20 Claims, 5 Drawing Sheets

Related U.S. Application Data

(60) Provisional application No. 62/214,663, filed on Sep. 4, 2015.

(51) Int. Cl.
    *H05B 1/02*           (2006.01)
    *F24C 3/12*           (2006.01)
    *H05B 6/06*           (2006.01)
    *G01J 5/00*           (2022.01)

(52) U.S. Cl.
    CPC ........... *H05B 1/0266* (2013.01); *H05B 6/062* (2013.01); *H05B 2213/07* (2013.01)

(58) Field of Classification Search
    USPC .......................................... 219/443.1–468.2
    See application file for complete search history.

(56) References Cited

U.S. PATENT DOCUMENTS

| | | |
|---|---|---|
| 5,437,002 A | 7/1995 | Bennet |
| 6,111,228 A | 8/2000 | Berkcan et al. |
| 6,118,105 A | 9/2000 | Berkcan et al. |
| 6,403,929 B2 | 6/2002 | Brindani |
| 6,554,197 B2 | 4/2003 | Marbach et al. |
| 8,530,842 B2 | 9/2013 | Has et al. |
| 9,132,302 B2 | 9/2015 | Luongo et al. |
| 9,220,130 B1 | 12/2015 | Smith |
| 10,935,252 B2 * | 3/2021 | Norman ................. H05B 6/062 |
| 2006/0013573 A1 | 1/2006 | Phillips |
| 2009/0159589 A1 | 6/2009 | Gratz |
| 2009/0212038 A1 | 8/2009 | Ahlander |
| 2012/0132647 A1 | 5/2012 | Beverly |
| 2012/0111852 A1 | 8/2012 | Bach |
| 2013/0008889 A1 | 1/2013 | Ogasawara et al. |
| 2013/0175254 A1 | 7/2013 | Bach |
| 2015/0373787 A1 | 12/2015 | Visher |
| 2016/0076775 A1 | 3/2016 | Luongo et al. |

\* cited by examiner

METHODS AND APPARATUS FOR CONTROLLING A COOKING APPLIANCE

CROSS-REFERENCE TO RELATED APPLICATIONS

This application is a continuation of U.S. application Ser. No. 15/255,491 filed on Sep. 2, 2016 which claims the benefit of U.S. Provisional Application No. 62/214,663, filed on Sep. 4, 2015, which is incorporated in its entirety herein by reference.

FIELD

The present invention relates generally to methods and apparatus for controlling a cooking appliance, and, more particularly, to methods and apparatus for controlling a cooking appliance based on a temperature or rate of temperature change of a cooking element.

BACKGROUND

Typically cooking appliances are made with heating elements that can reach between warming temperatures to several hundred degrees in order to cook foodstuff in cookware. With this comes some inherent risk of burns and fire. For example, if foodstuff within cookware reaches a high enough temperature, the foodstuff can ignite. As another example, if a cookware containing boiling water is kept on a working heating element for too long, the water will boil dry, at which point the cookware temperature will rapidly increase to temperatures that can cause serious burns. It is desirable to prevent cookware and foodstuff, and especially cooking or food oils, from reaching ignition temperatures. It is also desirable to prevent or reduce the instance of rapidly increasing temperatures in cookware on a cooktop.

SUMMARY

In accordance with a first aspect, a cooking appliance includes a cooktop having at least one heating element for heating a cookware member on or to be placed on the cooktop, the at least one heating element being adjustable between a working-power level wherein the at least one heating element is energized to generate heat and a zero-power level wherein the at least one heating element is not energized. The cooking appliance further includes a temperature sensor configured to detect a temperature or rate of temperature change of a cooking element. The cooking appliance further includes a control device configured to adjust the at least one heating element from the working-power level to the zero-power level based on the temperature or rate of temperature change of the cooking element, wherein the power level will remain at the zero-power level until a user intervenes to re-energize the heating element.

In accordance with a second aspect, a method is provided of operating a cooking appliance including a cooktop having at least one heating element for heating a cookware member on or to be placed on the cooktop. The method includes setting the at least one heating element at a working-power level that generates heat. The method further includes detecting a temperature or rate of temperature change of a cooking element. The method further includes adjusting the at least one heating element based on the detected temperature or rate of temperature change to a zero-power level, wherein the heating element remains at the zero-power level until a user intervenes to re-energize the heating element.

BRIEF DESCRIPTION OF THE DRAWINGS

The foregoing and other aspects will become apparent to those skilled in the art to which the present examples relate upon reading the following description with reference to the accompanying drawings, in which.

DETAILED DESCRIPTION

Figure 1:
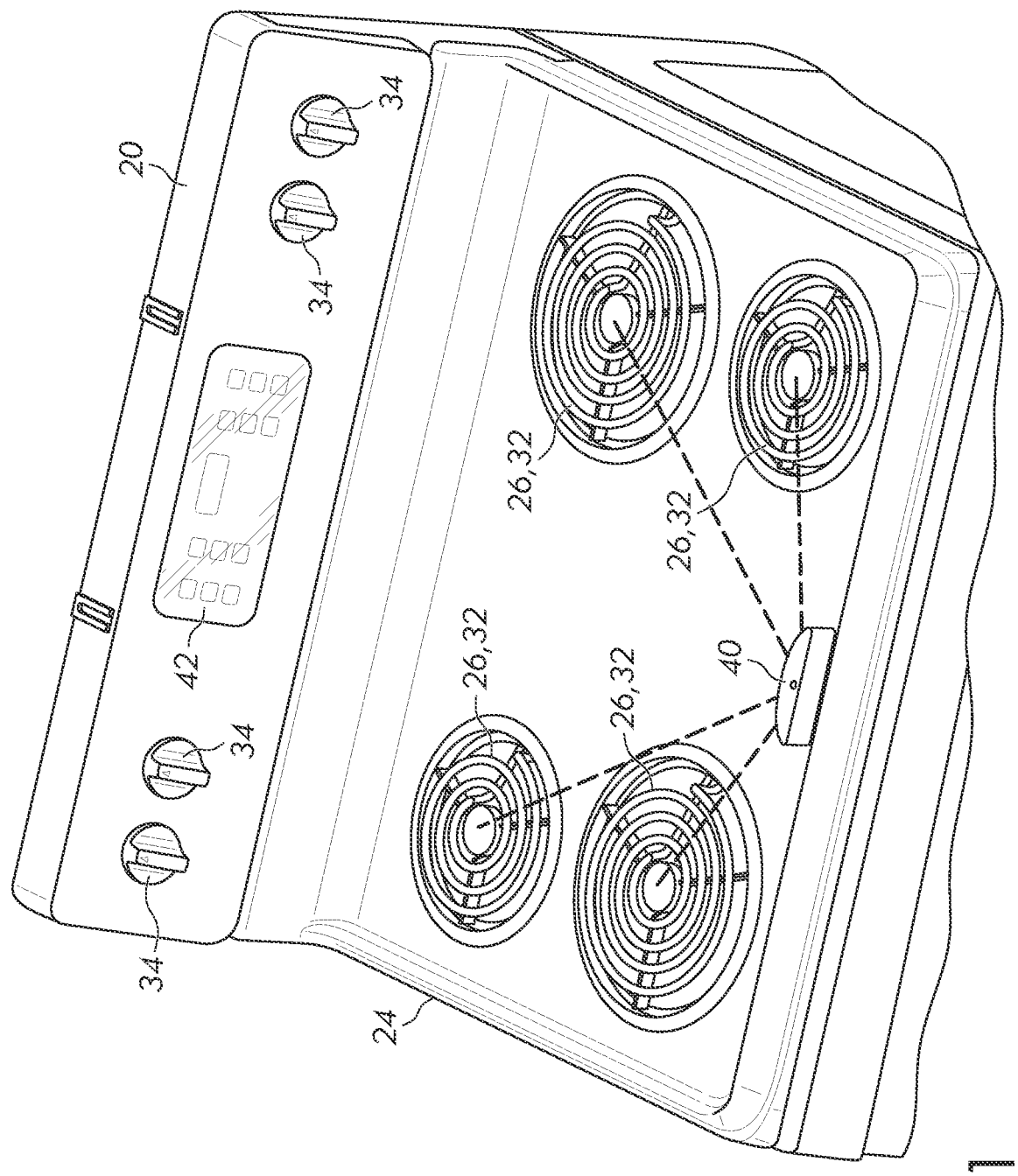
FIG. 1 is a perspective view of an example cooking appliance with a temperature sensor arranged according to one configuration.
Figure 2:
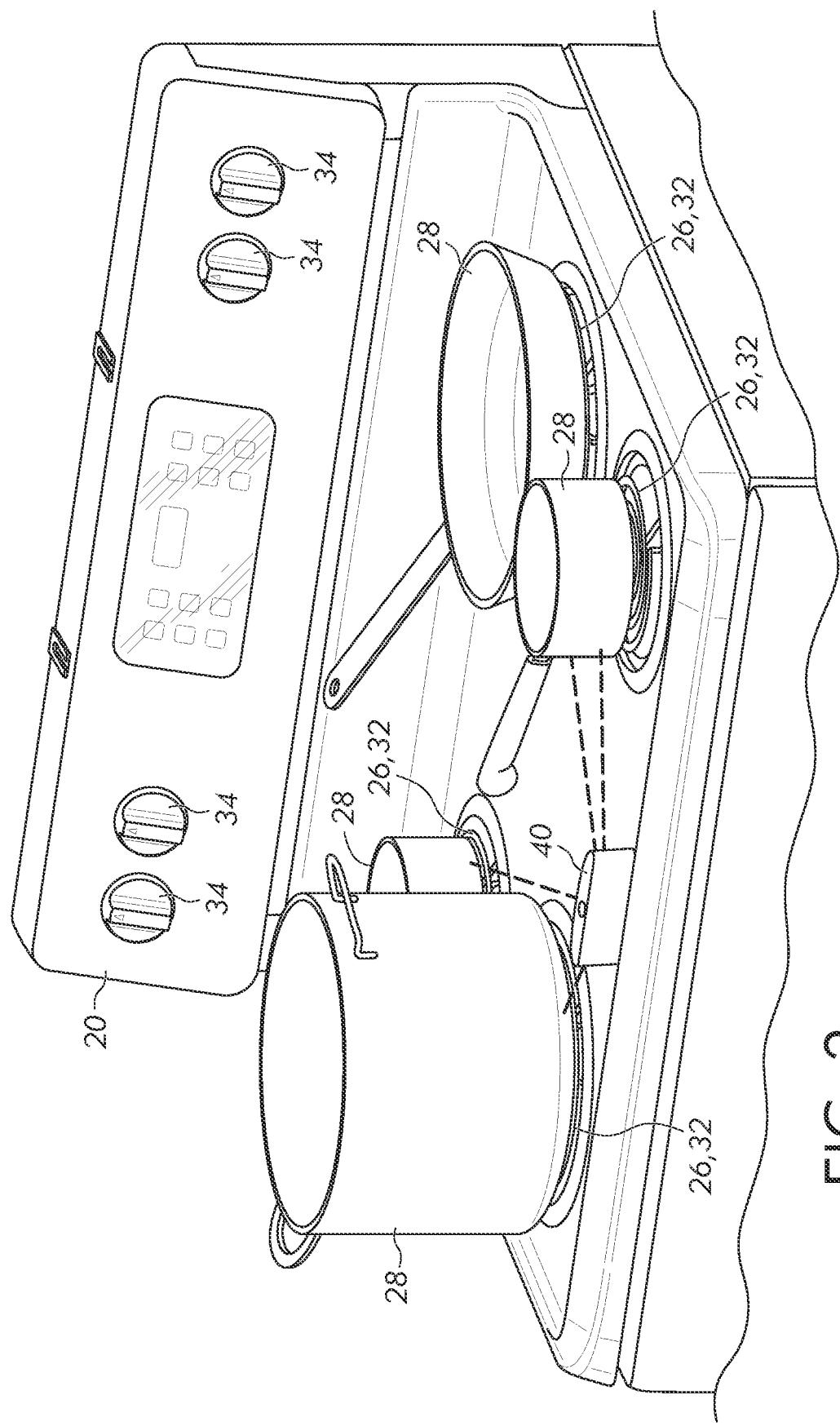
FIG. 2 is a perspective view of the example cooking appliance in FIG. 1 with cookware members on top of a cooktop of the cooking appliance.
Figure 3:
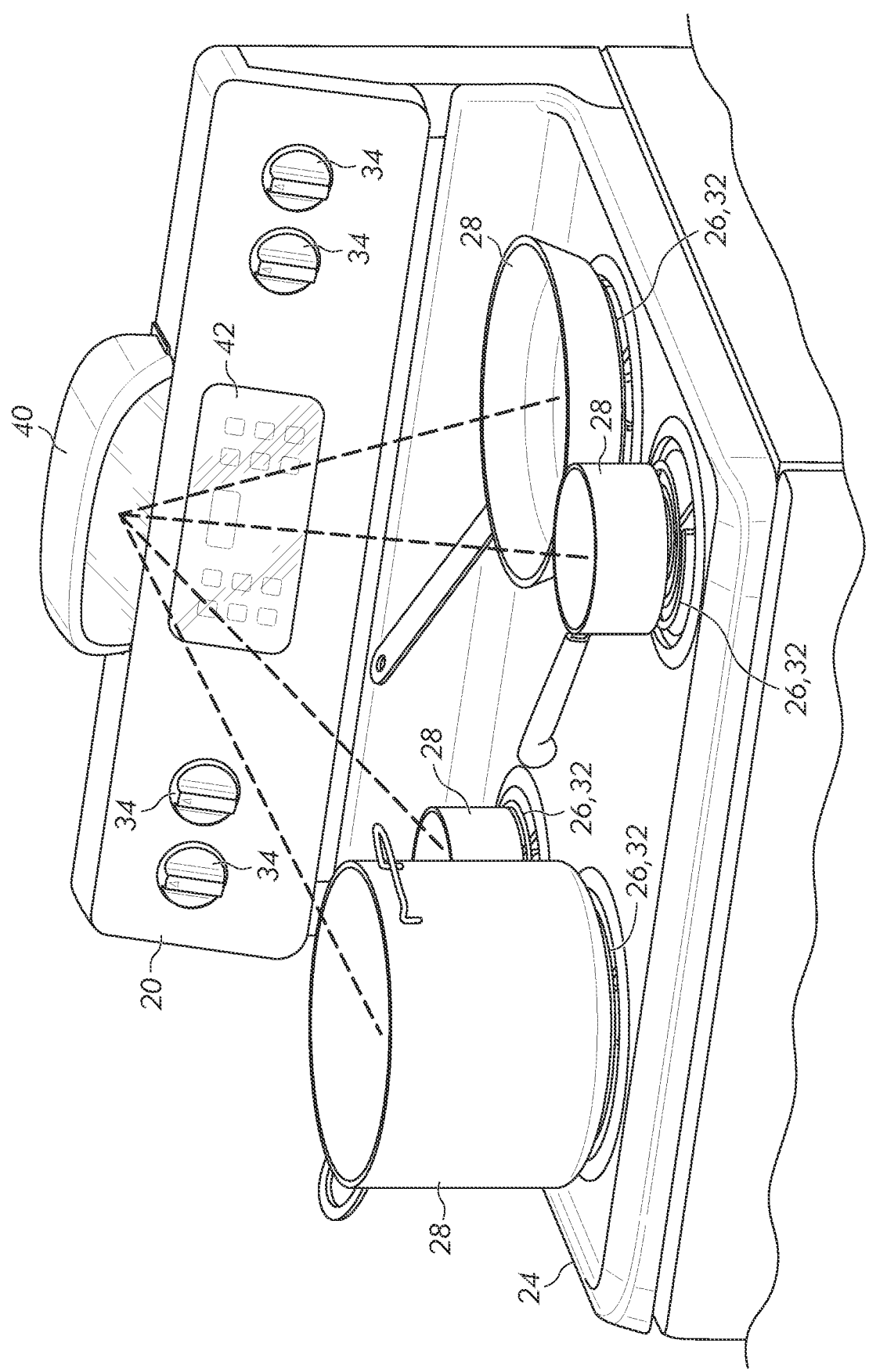
FIG. 3 is a perspective view of the example cooking appliance in FIG. 2 with the temperature sensor arranged according to another configuration.
Figure 4:
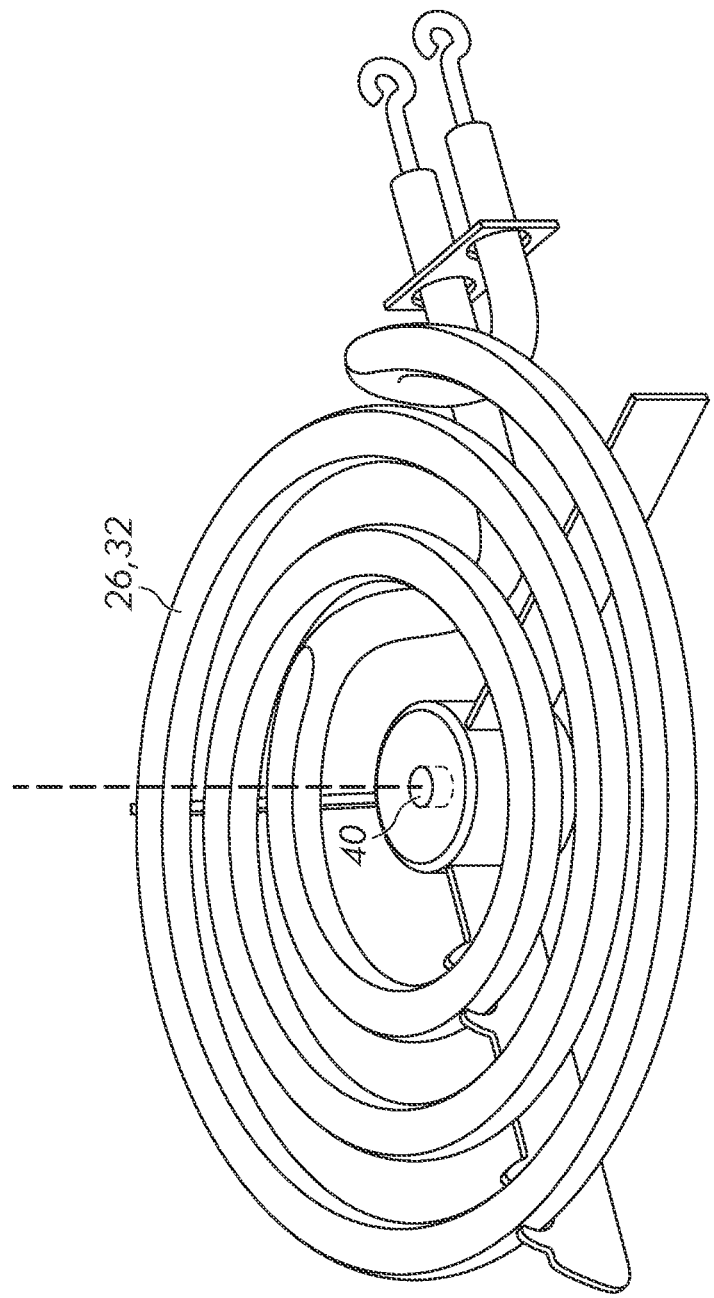
FIG. 4 is a perspective view of a heating element of the example cooking appliance with the temperature sensor arranged according to yet another configuration.

An example cooking appliance 20 is shown in FIGS. 1 & 2 that has a cooktop 24 having at least one heating element 26 for heating an associated cookware member 28 by conduction, convection, radiation, or some combination thereof. The cookware member 28 can be a pot, a pan, a skillet, or any other cooking apparatus or utensil that can be used to support or contain foodstuff to transfer heat generated by the heating element 26 to the foodstuff. It is to be appreciated that the foodstuff can be a solid, a liquid, or any other type of substance used in cooking. In embodiments of particular interest, the foodstuff will include or will be combined with a cooking oil or food oil for cooking in the cookware member.

Each heating element 26 can be adjustable between a working-power level wherein the heating element 26 is energized to generate heat, and a zero-power level wherein the heating element 26 is not energized to generate heat. For the purposes of this disclosure, a heating element is "energized" when power is being either 1) persistently applied to the heating element to persistently generate heat, or 2) periodically applied to the heating element according to a predetermined mode of operation to periodically generate heat. Moreover, a heating element is "not energized" when power is persistently not being applied to the heating element and an intervening, non-automatic, event will be required to apply power to and energize the heating element.

For instance, in the illustrated example, each heating element 26 includes an electric resistance element 32 that a current can be provided through to generate heat for transfer to its associated cookware member 28 and any foodstuff contained within. Each heating element 26 is adjustable between a working-power level wherein the electric resistance element 32 is energized and a zero-power level wherein the electric resistance element 32 is not energized. At the working-power level, current can be persistently applied to the electric resistance element 32, thereby persistently generating heat and causing the electric resistance element 32 to increase in temperature until eventually, the electric resistance element 32 reaches a maximum temperature of, for example, 700° C. Alternatively, current can be periodically applied to the electric resistance element 32 according to a predetermined mode of operation to periodically generate heat so that the operating temperature of the electric resistance element 32 is maintained about a lower temperature of, for example, 400° C. or greater. For example, current can be periodically applied according to a program set by a controller or the current can be periodically applied according to a bimetal switch that is designed to open and close in a predetermined manner to periodically apply current to the electric resistance element 32. At the zero-power level, current is persistently not applied to the electric resistance element 32 such that heat is not generated by the heating element 32 and an intervening, non-automatic, event such as, for example, user adjustment of the heating element 26 will be required to apply power to and energize the heating element. It is to be noted that when each heating element 26 is adjusted to its zero-power level, although the heating element 26 will not generate heat, it may still release heat from thermal energy still stored in the element from when it was energized.

In other examples, the heating elements 26 can include a gas burner that receives a flow of gas to generate heat via combustion of the gas. Each heating element 26 can be adjustable between a working-power level wherein the heating element 26 is energized by receiving the flow of gas so as to generate heat via combustion of the gas and a zero-power level wherein no flow of gas is delivered to the gas burner. The rate of flow of the gas delivered to the gas burner at the working-power level can be any positive rate of flow.

In still other examples, the heating elements 26 can include an induction coil that a current can be provided through to induce the generation of heat in the cookware member 28 itself. Each heating element 26 can be adjustable between a working-power level wherein the current is persistently or periodically provided through its induction coil to persistently or periodically generate heat in the cookware member 28 and a zero-power level wherein current is persistently not provided through the induction coil. The heating elements 26 can include any element that is adjustable between a working-power level wherein the element 26 is energized such that it persistently or periodically generates heat and a zero-power level wherein the element 26 is not energized to generate heat.

To adjust the power level of each heating element 26, the cooking appliance 20 can include an associated control knob 34, a switch, or some other means that can be adjusted to change the power level of the heating element 26. For example, by turning its associated control knob 34, the period of current or flow of gas to a heating element 26 can be adjusted.

When operating a heating element 26 of the cooking appliance 20 described above, the heating element 26 can be set to a working-power level to generate heat for transfer to (or in the case of induction, to generate heat in) the associated cookware member 28. As heat is transferred to (or generated in) the associated cookware member 28, the temperature of the cookware member 28 and any foodstuff contained therein can rise. If the temperature is high enough, it is possible that the foodstuff and especially cooking or food oils therein could ignite, thus causing a fire. For example, some oils have been known to ignite at temperatures between 399-427° C. (750-800° F.). To prevent or reduce the incidence or chances of such ignition, the cooking appliance 20 can include a temperature sensor 40 and a control device 42 that can be configured to automatically adjust the heating element 26 from a working-power level to a zero-power level in situations where ignition might occur.

For example, the temperature sensor 40 can be configured to detect a temperature T or rate of temperature change with time $\Delta T/t$ of a cooking element. The cooking element can be a portion of the cooktop 24 (e.g., heating element 26), a portion of a cookware member 28, a portion of foodstuff provided within the cookware member 28, or any other element having a temperature or rate of temperature change that can indicate the temperature or rate of temperature change of foodstuff or other contents provided within the cookware member 28 being heated via the heating element 26. The temperature sensor 40 can include a non-contact infrared sensor, a thermocouple, or any other sensor that is configured to detect a temperature T or rate of temperature change $\Delta T/t$ of the cooking element.

FIGS. 1-4 show various embodiments wherein the temperature sensor 40 includes one or more non-contact infrared sensors configured to detect the temperature T of one or more cooking elements. For example, as shown in FIGS. 1 & 2, the temperature sensor 40 can include multiple infrared sensors that can be arranged at a side of the cooktop 24 with the infrared sensors aimed toward different heating elements 26 such that when a cookware member 28 is placed on top of a heating element 26, the associated infrared sensor of the temperature sensor 40 can detect the temperature T of a side portion of the cookware member 28. In the example shown in FIG. 3, the temperature sensor 40 can include multiple infrared sensors that can be arranged above the cooktop 24 with the infrared sensors aimed downward toward different heating elements 26 such that when a cookware member 28 is placed on top of a heating element 26, the corresponding infrared sensor of the temperature sensor 40 can detect the temperature T of foodstuff or other contents within the cookware member 28. In the example shown in FIG. 4, the temperature sensor 40 can be or include a single infrared sensor that is arranged within the center of the electric resistance element 32 of a heating element 26 and directed upward such that when the cookware member 28 is placed on top of the heating element 26, the infrared sensor of the temperature sensor 40 can detect the temperature T of a bottom portion of the cookware member 28. It should be appreciated that the temperature sensor 40 can take on a variety of different configurations that can detect a temperature T or rate of temperature change $\Delta T/t$ of a cooking element without departing from the scope of the invention as-claimed.

The temperature sensor 40 can be configured to send a signal to the control device 42 indicating the temperature T or rate of temperature change $\Delta T/t$ of the cooking element being monitored. The control device 42 can be any kind of microprocessor unit that is configured to receive a signal from the temperature sensor 40 and control the heating element 26 based on the received signal. If the signal merely indicates temperature T, the control device 42 can be configured to calculate the rate of temperature change $\Delta T/t$ based on how the indicated temperature T changes over time. Based on the temperature T or rate of temperature change $\Delta T/t$ of the cooking element being monitored by the temperature sensor 40, the control device 42 can be configured to adjust the heating element 26 from a working-power level to the zero-power level. In particular, the control device 42 can include or operate according to an algorithm that controls adjustment of the heating element 26 to its zero-power level based on the temperature T or rate of temperature change $\Delta T/t$ of the cooking element.

Figure 5:
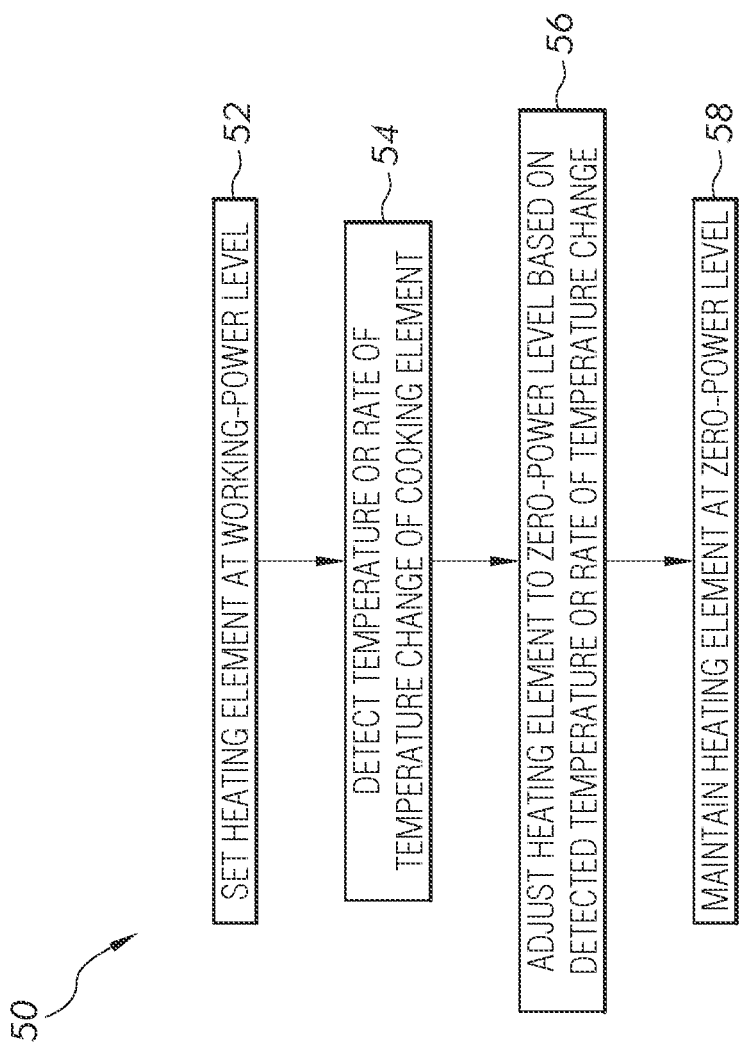
FIG. 5 is a flow chart illustrating a method of operating the example cooking appliance.

One example algorithm for the control device 42 is shown in FIG. 5. Under this algorithm, the control device 42 is configured to adjust the heating element 26 from a working-power level to the zero-power level in response to the temperature T of the cooking element being equal to or above a threshold temperature X. This adjustment is independent of the rate of temperature change ΔT/t of the cooking element, meaning that the control device 42 will adjust the heating element 26 to the zero-power level when the temperature T is equal to or above the threshold temperature X regardless of how slow or fast the temperature T is increasing. The threshold temperature X can be a value that is predetermined based on what temperatures of the cooking element are determined likely to avoid the ignition of foodstuff, e.g. oils, within the cookware member 28. For example, testing and analysis have shown that pan temperatures at roughly 371° C. (700° F.) or below will avoid temperatures at which a preponderance of fires from ignition of foodstuff and oils within the pan occur. Accordingly, in some examples, the threshold temperature X can be at or about 371° C. (700° F.). However, the temperature of the foodstuff within the cookware member 28 can rise for a period of time after the heating element 26 has been adjusted to the zero-power level due to residual heat still stored in the heating element 26. Accordingly, it may be preferable to set the threshold temperature X lower than 371° C. (700° F.) to account for this later rise in temperature. For example, in some cases, the threshold temperature X can be about 316° C. (600° F.). The threshold temperature X can be a variety of different temperatures above or below 371° C. (700° F.) without departing from the scope of the invention.

Preferably, the threshold temperature X is set high enough such that the heating performance of the heating element 26 for cooking operations is not overly compromised. However, if the threshold temperature X is set too high, there may be situations where foodstuff could still ignite.

Moreover, in situations such as when water within a cookware member 28 boils dry, the cookware member 28 may be lower in temperature than the threshold temperature X but nonetheless rapidly increasing ("runaway") in temperature because now there is no more load to absorb thermal energy generated by the heating element 26. Accordingly, under the algorithm in FIG. 5, the control device 42 is also separately configured to adjust the heating element 26 from a working-power level to the zero-power level in response to the rate of temperature change ΔT/t of the cooking element being equal to or above a threshold rate of temperature change Y. This adjustment is independent of the temperature T of the cooking element, meaning that the control device 42 will adjust the heating element 26 to the zero-power level when the rate of temperature change ΔT/t is equal to or above the threshold rate of temperature change Y regardless of what temperature T the cooking element is at. The threshold rate of temperature change Y can be a value that is predetermined based on what rates of temperature change that indicate a boil-dry scenario or rates that are likely to avoid the ignition of foodstuff within the cookware member 28. The threshold rate of temperature change Y can be a variety of different rates without departing from the scope of the invention.

The control device 42 can be further configured such that after the control device 42 adjusts the heating element 26 from its working-power level to the zero-power level, the control device 42 is configured to maintain the heating element 26 at the zero-power level regardless of the temperature T or rate of temperature change ΔT/t of the cooking element. In other words, the control device 42 will not adjust the heating element 26 back to a working-power level, even if the temperature T and rate of temperature change ΔT/t return to below their threshold values without the intervention of a user. In order to adjust the heating element 26 back to its working-power level, a user will have to manually adjust or reset the heating element 26. By requiring manual readjustment of the heating element 26, the heating element 26 will remain at its safe, zero-power level until a user notices that the heating element 26 is not energized and addresses the situation or condition that caused the algorithm to set the heating element 26 to its zero-power level in the first place.

Turning now to FIG. 6, an example method 50 will now be described for operating a heating element 26 of the cooking appliance 20 described above. The method 50 can first include the step 52 of setting the heating element 26 to a working-power level wherein the heating element 26 is energized to generate heat either for transfer to or directly in its associated cookware member 28 and/or contained foodstuff. The method 50 can further include the step 54 of detecting a temperature or rate of temperature change of a cooking element that indicates or is or can be correlated to the temperature or rate of temperature change of foodstuff within the cookware member 28. For example, the temperature sensor 40 described above can be used to detect the temperature T or rate of temperature change ΔT/t of a portion of the cooktop 24 (e.g., heating element 26), a portion of the cookware member 28, a portion of foodstuff provided within the cookware member 28, or any other element having a temperature or rate of temperature change that can indicate or be representative of or correlated to the temperature or rate of temperature change of foodstuff provided within the cookware member 28.

The method can further include the step 56 of adjusting the heating element 26, based on the detected temperature or rate of temperature change, to its zero-power level wherein the heating element 26 is not energized. For example, the heating element 26 can be adjusted to the zero-power level in response to the temperature T of the cooking element being equal to or above the threshold temperature X described above, independent of the rate of temperature change ΔT/t of the cooking element. As another example, the heating element 26 can be adjusted to the zero-power level in response to the rate of temperature change ΔT/t of the cooking element being equal to or above the threshold rate of temperature change Y described above, independent of the temperature T of the cooking element. The heating element 26 can be adjusted manually using its associated control knob 34, a switch, or some other means that can be adjusted to change the power level of the heating element 26. Alternatively, the heating element 26 can be adjusted automatically using the control device 36 described above.

The method can further include the step 58 of maintaining the heating element 26 at the zero-power level regardless of the temperature T or rate of temperature change ΔT/t of the cooking element. In other words, the heating element 26 will not be automatically adjusted back to its working-power level even once the temperature T and/or rate of temperature change ΔT/t return(s) to below its/their threshold values. Rather, in order to adjust the heating element 26 back to its working-power level, a user will have to intervene to manually adjust the heating element 26.

The invention has been described with reference to example embodiments described above. Modifications and alterations will occur to others upon a reading and understanding of this specification. Example embodiments incorporating one or more aspects described above are intended to include all such modifications and alterations insofar as they come within the scope of the appended claims.

What is claimed is:

1. A cooking appliance comprising:
   a cooktop having at least one heating element for heating a cookware member on or to be placed on the cooktop, the at least one heating element being adjustable between a working-power level wherein the at least one heating element is energized to generate heat and a zero-power level wherein the at least one heating element is not energized;
   a temperature sensor configured to detect a temperature or rate of temperature change of a cooking element; and
   a control device configured to adjust the at least one heating element from the working-power level to the zero-power level when the rate of temperature change of the cooking element is equal to or above a threshold rate of temperature change, wherein the adjustment is made irrespective of the value of power presently being applied to the at least one heating element and of the present value of temperature of the cooking element.

2. The cooking appliance according to claim 1, wherein the control device is further configured to adjust the at least one heating element from the working-power level to the zero-power level in response to the temperature of the cooking element being equal to or above a threshold temperature, independent of the rate of temperature change of the cooking element.

3. The cooking appliance according to claim 2, wherein the threshold temperature is at or about 371° C. (700° F.).

4. The cooking appliance according to claim 2, wherein the threshold temperature is less than 371° C. (700° F.).

5. The cooking appliance according to claim 1, wherein the cooking element comprises a portion of the cooktop, a portion of the cookware member when placed on the cooktop, or a portion of foodstuff provided within the cookware member when placed on the cooktop.

6. The cooking appliance according to claim 1, wherein the at least one heating element comprises an electric resistance element.

7. The cooking appliance according to claim 1, wherein the at least one heating element comprises a gas burner.

8. The cooking appliance according to claim 1, wherein the temperature sensor comprises an infrared sensor.

9. The cooking appliance according to claim 1, wherein the temperature sensor comprises an infrared sensor that is arranged at a side of the cooktop and aimed toward the heating element.

10. The cooking appliance according to claim 1, wherein the temperature sensor comprises an infrared sensor that is arranged above the cooktop and aimed downward toward the heating element.

11. The cooking appliance according to claim 1, wherein the temperature sensor comprises an infrared sensor that is arranged at a center of the heating element and aimed upward.

12. The cooking appliance according to claim 1, wherein after the adjustment of the at least one heating element from the working-power level to the zero-power level, the control device is configured to maintain the at least one heating element at the zero-power level irrespective of the present value of the rate of temperature change of the cooking element.

13. A method of operating a cooking appliance comprising a cooktop having at least one heating element for heating a cookware member on or to be placed on the cooktop, the method comprising:
   setting the at least one heating element at a working-power level wherein the at least one heating element is energized to generate heat;
   detecting a temperature or rate of temperature change of a cooking element; and
   adjusting the at least one heating element based on the detected temperature or rate of temperature change to a zero-power level wherein the at least one heating element is not energized,
   wherein the at least one heating element is adjusted from the working-power level to the zero-power level when the rate of temperature change of the cooking element is equal to or above a threshold rate of temperature change, wherein the adjustment is made irrespective of the value of power presently being applied to the at least one heating element and of the present value of temperature of the cooking element.

14. The method according to claim 13, wherein the at least one heating element is adjusted from the working-power level to the zero-power level in response to the temperature of the cooking element being equal to or above a threshold temperature, independent of the rate of temperature change of the cooking element.

15. The method according to claim 13, wherein the threshold temperature is about 371° C. (700° F.) or less.

16. The method according to claim 13, wherein the cooking element comprises a portion of the cooktop, a portion of the cookware member when placed on the cooktop, or a portion of foodstuff provided within the cookware member when placed on the cooktop.

17. The method according to claim 13, wherein the at least one heating element comprises an electric resistance element.

18. The method according to claim 13, wherein the at least one heating element comprises a gas burner.

19. The method according to claim 13, wherein the temperature or rate of temperature change is detected using an infrared sensor.

20. The method according to claim 13, wherein after the adjustment of the at least one heating element from the working-power level to the zero-power level, the at least one heating element at the zero-power level is maintained irrespective of the present value of the rate of temperature change of the cooking element.

* * * * *